United States Patent [19]

Tsuchiya

[11] Patent Number: 5,041,930

[45] Date of Patent: Aug. 20, 1991

[54] APPARATUS HAVING A SINGLE CAPSTAN MOTOR FOR RECORDING/REPRODUCING DATA ON A MAGNETIC TAPE

[75] Inventor: Yuzo Tsuchiya, Fukaya, Japan

[73] Assignee: Kabushiki Kaisha Toshiba, Kawasaki, Japan

[21] Appl. No.: 457,974

[22] Filed: Dec. 27, 1989

[30] Foreign Application Priority Data

Dec. 27, 1988 [JP] Japan .................. 63-327549

[51] Int. Cl.$^5$ .................. G11B 15/00; G11B 15/32
[52] U.S. Cl. .................. 360/96.5; 360/93; 360/95; 360/96.1; 242/198
[58] Field of Search .................. 360/96.5, 93, 85, 95, 360/96.1; 242/198, 200, 199

[56] References Cited

U.S. PATENT DOCUMENTS

| | | | |
|---|---|---|---|
| 4,059,245 | 11/1977 | Hirose | 242/201 |
| 4,060,840 | 11/1977 | Umeda | 360/130 |
| 4,122,506 | 10/1978 | Kubo et al. | 360/130 |
| 4,133,497 | 1/1979 | Rothlisberger | 242/200 |
| 4,264,937 | 4/1981 | Kabacinski | 360/85 |
| 4,319,292 | 3/1982 | Katoh | 360/96.5 |
| 4,370,682 | 1/1983 | Katoh | 360/71 |
| 4,577,246 | 3/1986 | Matsuki | 360/96.5 |
| 4,628,383 | 11/1986 | Miyamoto | 360/96.5 |
| 4,642,714 | 2/1987 | Miyamoto | 360/96.5 |
| 4,704,643 | 11/1987 | Matsuoka et al. | 360/71 |
| 4,723,177 | 2/1988 | Ahn | 360/96.5 |
| 4,739,424 | 4/1988 | Yamada et al. | 360/96.5 |
| 4,768,113 | 8/1988 | Sato | 360/96.5 |
| 4,809,100 | 2/1989 | Tanaka et al. | 360/93 |
| 4,825,322 | 4/1989 | Kunze | 360/93 |
| 4,837,645 | 6/1989 | Nagai et al. | 360/85 |
| 4,851,938 | 7/1989 | Inami | 360/69 |
| 4,858,042 | 8/1989 | Ito et al. | 360/96.5 |
| 4,866,549 | 9/1989 | Terayama et al. | 360/85 |
| 4,872,075 | 10/1989 | Uehara et al. | 360/96.5 |
| 4,918,549 | 4/1990 | Katono et al. | 360/93 |
| 4,930,720 | 6/1990 | Hwang | 360/96.5 |

FOREIGN PATENT DOCUMENTS 0203306 12/1986 European Pat. Off. .

*Primary Examiner*—Aristotelis M. Psitos
*Assistant Examiner*—Alfonso Garcia
*Attorney, Agent, or Firm*—Cushman, Darby & Cushman

[57] ABSTRACT

A driving gear is attached to a capstan motor used for driving a capstan. The driving gear is rotated together with the capstan motor. A vertically-movable gear, which is movable in the axial direction thereof, faces the driving gear, and is designed in such a manner as to selectively mesh with the driving gear. The vertically-movable gear is moved up or down by a switch lever, and this switch lever is swung in accordance with the rotation of a mode-switching cam. When the vertically-movable gear is raised by the up swing of the switch lever and brought into mesh with the driving gear, a front loading mechanism moves a cassette holder which holds a tape cassette containing a magnetic tape, and loads the tape cassette in a tape-driving mechanism by utilization of the rotating force of the driving gear transmitted to the front loading mechanism through the vertically-movable gear. When the tape cassette has been loaded in the tape-driving mechanism, the switch lever moves down the vertically-movable gear in accordance with the rotation of the mode-switching cam, thereby disengaging the vertically-movable gear from the driving gear. In this manner, the operation of the front loading mechanism is stopped.

4 Claims, 7 Drawing Sheets

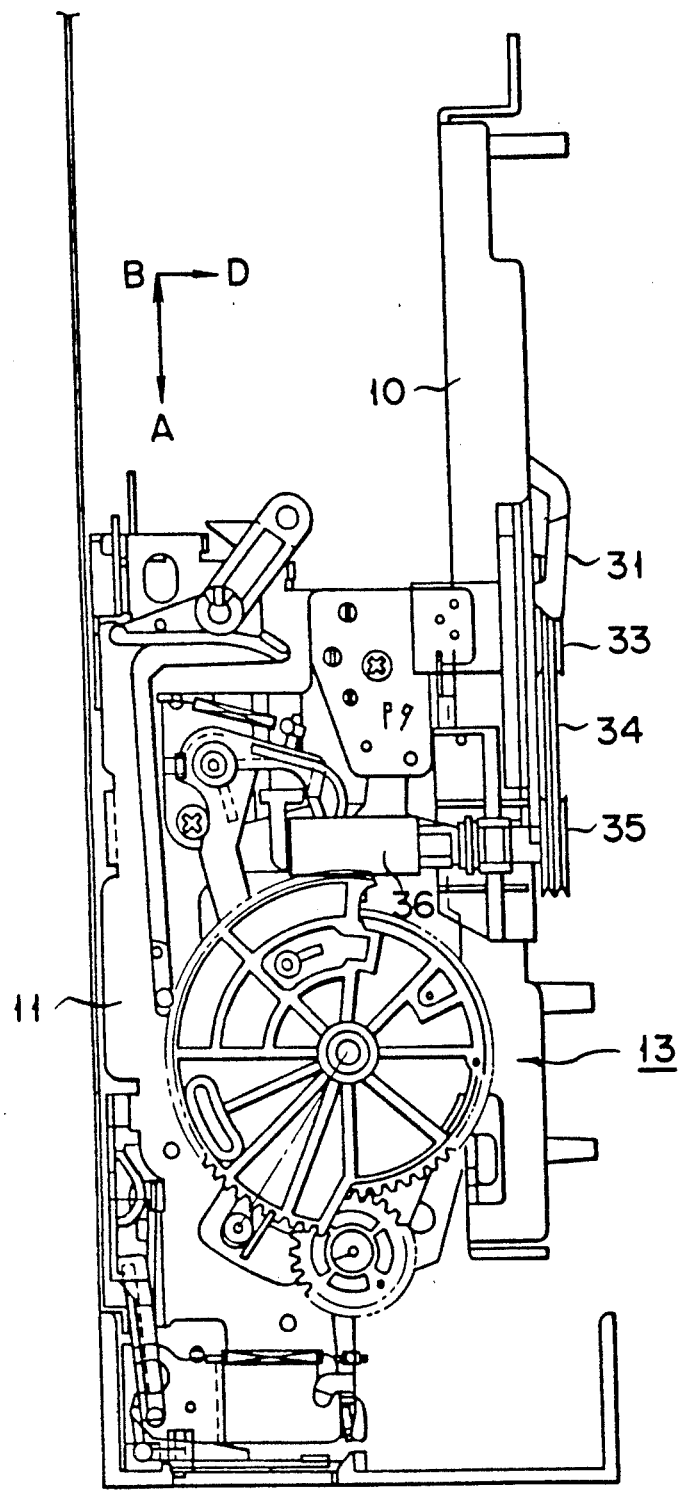
F I G. 1B

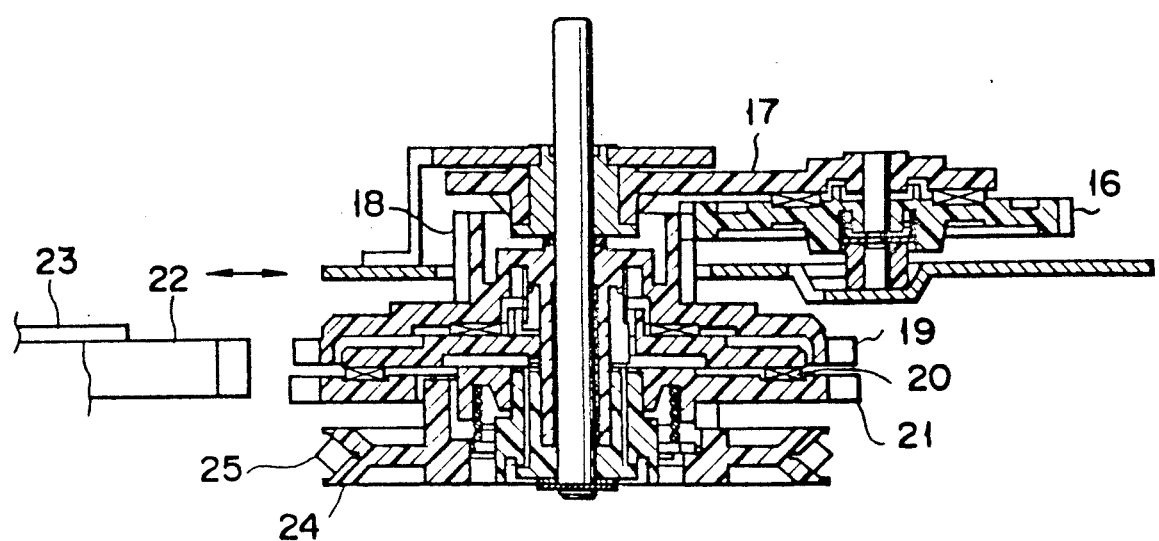
F I G. 2
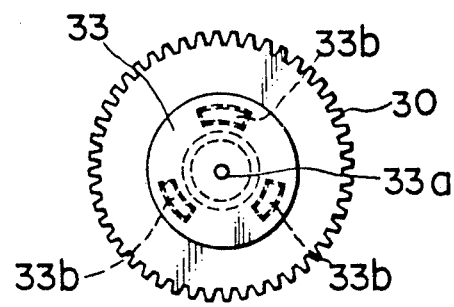
F I G. 4A
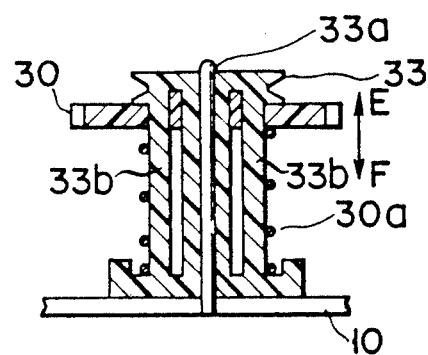
F I G. 4B

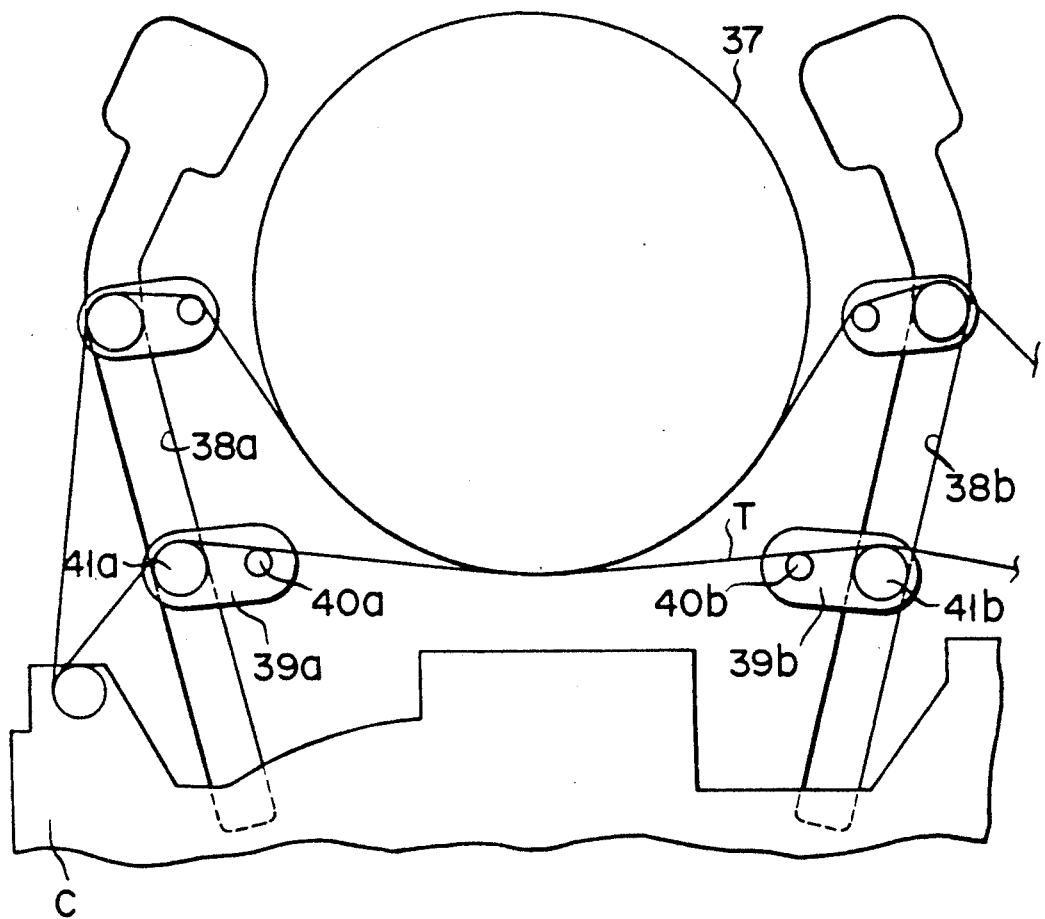
F I G. 5A
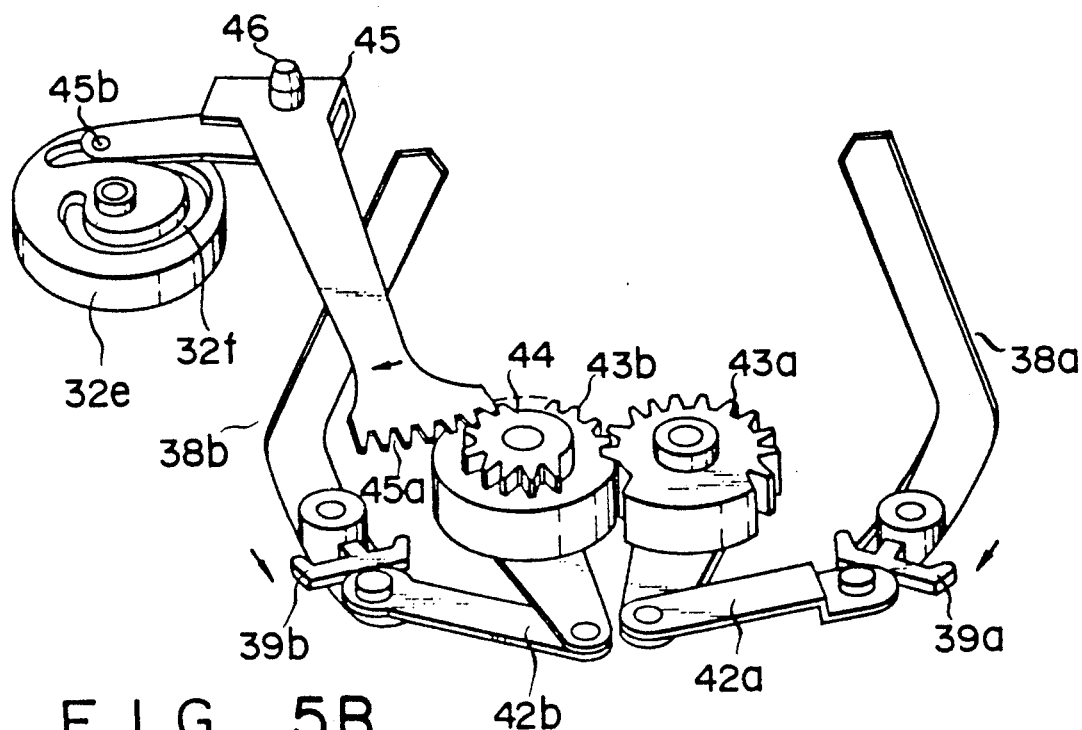
F I G. 5B

APPARATUS HAVING A SINGLE CAPSTAN MOTOR FOR RECORDING/REPRODUCING DATA ON A MAGNETIC TAPE

BACKGROUND OF THE INVENTION

1. Field of the Invention

The present invention relates to a magnetic recording/reproducing apparatus (such as a video tape recorder [VTR]) having a capstan motor.

2. Description of the Related Art

As is well known, a helical scan VTR is provided with both a front loading mechanism and a tape-loading mechanism. When a video tape cassette containing a video tape is horizontally inserted into the cassette insertion port formed in the front face of the VTR, the front loading mechanism receives and draws the cassette inside, and then lowers the cassette until it comes to the predetermined cassette-loading position. Thereafter, the tape-loading mechanism pulls the tape out of the cassette placed at the cassette-loading position and guides the tape such that it is in contact with about half of the circumference of the rotating cylinder. After the tape-loading mechanism sets the tape along the tape feed path in this way, various operation modes, such as recording, play, freeze (i.e., still image reproduction), slow play, fast-forward play, fast-rewind play, fast forward, and fast rewind, are selectively established with a mode-establishing mechanism and its associated circuits. If an eject key is operated, the tape-loading mechanism draws the tape back into the cassette, and the front loading mechanism returns the cassette from the cassette-loading position to the cassette insertion port.

With the recent trend toward miniaturization, it is demanded that the structural components of this type of magnetic recording/reproducing apparatus be simplified and reduced in both number and weight, without adversely affecting the ability to control the operation with high accuracy.

In a conventional VTR, the front loading mechanism for moving tape cassette to the predetermined tape-loading position, the tape-loading mechanism for pulling the tape out of the tape cassette and bringing the tape into contact with the cylinder, and the tape-driving mechanism for driving the loaded tape are all driven or controlled by the use of different motors specially designed for their respective purposes. Since each of these specially-designed motors can be controlled with high accuracy independently of the others, the operation of the driven-components of the VTR can be controlled with high accuracy. Due to the use of the specially-designed motors, however, the construction of the conventional VTR cannot be easily reduced in size or weight. It is therefore too difficult to manufacture a simple, light-in-weight VTR which meets the recent trend toward miniaturization.

Under these circumstances, it is thought to combine the front loading mechanism, the tape-loading mechanism and the tape-driving mechanism together in such a way that they can be driven or controlled by the same motor. If these mechanisms are combined in this way, the number of structural components can be reduced, so that a small-sized, light-in-weight VTR can be obtained. However, if the three mechanisms are merely combined together, they cannot be driven or controlled with high accuracy by the single motor. Therefore, the highly-accuracy control of the operation of the VTR becomes impossible to perform.

SUMMARY OF THE INVENTION

It is, accordingly, an object of the invention to provide a magnetic recording/reproducing apparatus which is reduced in both size and weight to the possible degree without adversely affecting the highly-accurate control of operation.

To achieve this object, the present invention provides a magnetic recording/reproducing apparatus which comprises: a tape-driving mechanism for driving a magnetic tape with reference to a magnetic head, for recording and/or reproduction of data, the tape-driving mechanism including a capstan motor for driving a capstan located in a feed path of the magnetic tape; a first gear rotated in association with rotation of the capstan motor; a second gear movable in the axial direction thereof and selectively engageable with the first gear; a front loading mechanism for moving a cassette holder which holds a tape cassette containing the magnetic tape such that the tape cassette is loaded in the tape-driving mechanism; and switching means for disengaging the second gear from the first gear by moving the second gear in the axial direction thereof when the tape cassette has been loaded in the tape-driving mechanism.

BRIEF DESCRIPTION OF THE DRAWINGS

FIG. 1A-1C are top, side and bottom views, respectively, of a VTR according to one embodiment of a magnetic recording/reproducing apparatus of the present invention;

FIG. 2 is a sectional view of a clutch gear mechanism;

FIGS. 4A and 4B are top and bottom views, respectively, illustrating both a pulley and a vertically-movable gear;

FIGS. 5A and 5B are top and bottom views, respectively, illustrating a tape-loading mechanism.

DETAILED DESCRIPTION OF THE PREFERRED EMBODIMENTS

One embodiment of the present invention will now be described, with reference to the accompanying drawings.

Figure 1A:
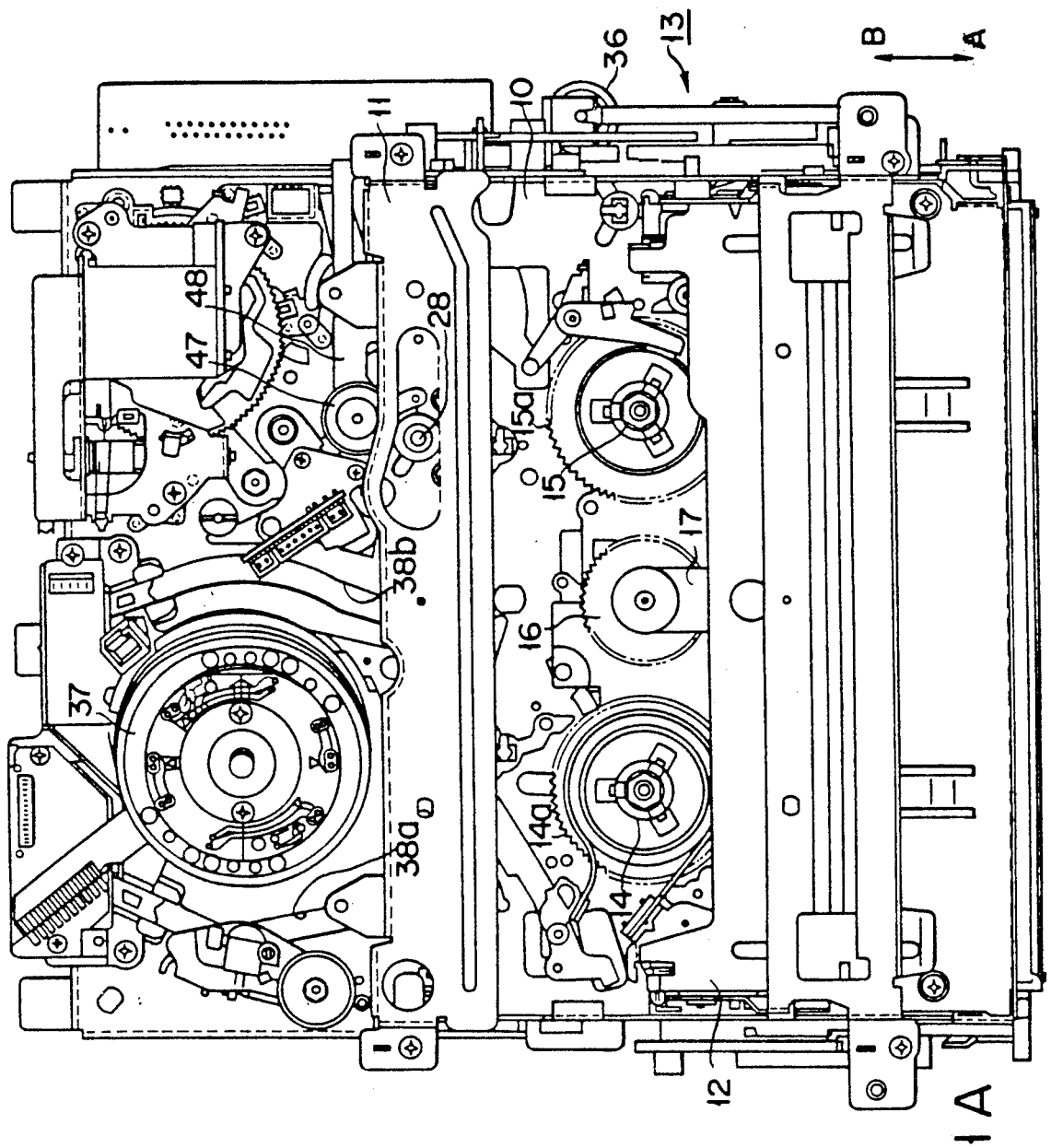
Figure 1C:
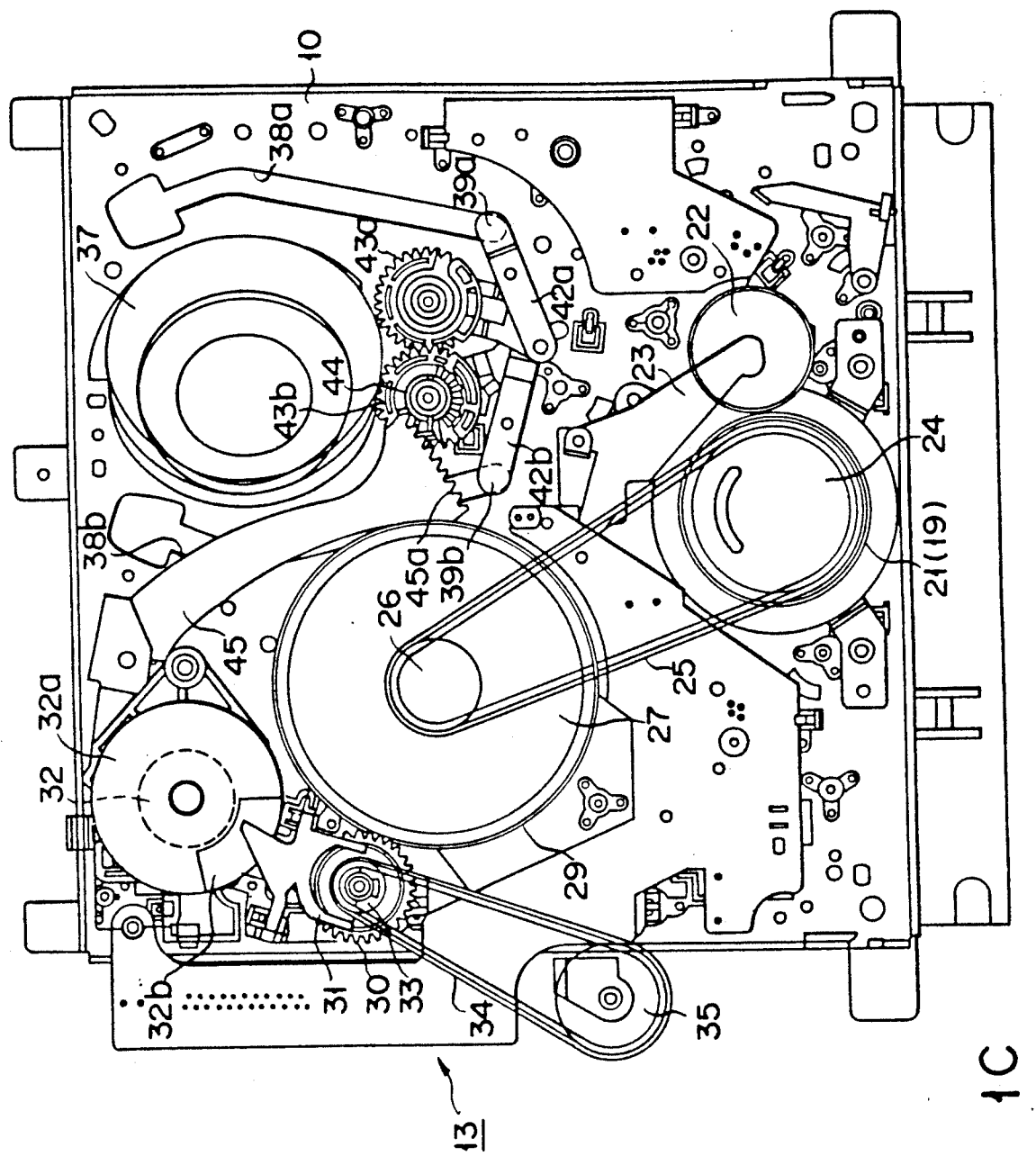

FIGS. 1A, 1B and 1C are top, side and bottom views, respectively, of a magnetic recording/reproducing apparatus according to one embodiment of the present invention. Referring to the Figures, frame member 11 is coupled to one end of main chassis 10. Cassette holder 12 is supported by frame member 11 such that it is movable in the directions indicated by arrows A, B and D (the direction indicated by arrow D is perpendicular to the directions indicated by arrows A and B). Cassette holder 12 is adapted to receive cassette C (which is not shown in FIGS. 1A, 1B and 1C, for simplicity) when it is located at the cassette insertion port. In response to the insertion of cassette C into cassette holder 12, front loading mechanism 13 is automatically driven. This front loading mechanism moves cassette holder 12 in direction B, together with cassette C inserted therein, until cassette holder 12 reaches a predetermined position. Then, front loading mechanism 13 moves cassette holder 12 in direction D. As a result, cassette C is fitted on supply reel bases 14 and 15, which are parts of a tape-driving mechanism.

Gears 14a and 15a are coupled to reel bases 14 and 15, respectively. Driving gear 16 constituting part of the tape-driving mechanism is located between gears 14a and 15a. This driving gear 16 is supported by one end of swing member 17.

As is shown in FIG. 2, gear 18, which is in mesh with driving gear 16, is attached to the other end of swing member 17. First clutch gear 19, which is part of a clutch gear mechanism, is arranged coaxial with gear 18. Second clutch gear 21, which is also part of the clutch gear mechanism, is stacked upon first clutch gear 19, with friction member 20 interposed therebetween. Clutch-switching gear 22 is arranged in such a manner as to face both gears 19 and 21. Clutch-switching gear 22 can be brought into contact with the first and second clutch gears 19 and 21, and can be moved away from them. Clutch-switching gear 22 is swung by changeover slider 23 (which interlocks with an operation mode-switching mechanism), such that it is selectively brought into mesh with both clutch gears 19 and 21. Pulley 24 is arranged coaxial with second clutch gear 21, and driving belt 25 is wound around pulley 24.

As is shown in FIG. 1C, driving belt 25 is wound around driving pulley 26. This driving pulley 26 is fitted on the rotating shaft of capstan motor 27. Therefore, the driving force of capstan motor 27 is transmitted first to pulley 24 via driving belt 25, and then to second clutch gear 21. Capstan shaft 28 is arranged coaxial with capstan motor 27.

Figure 3:
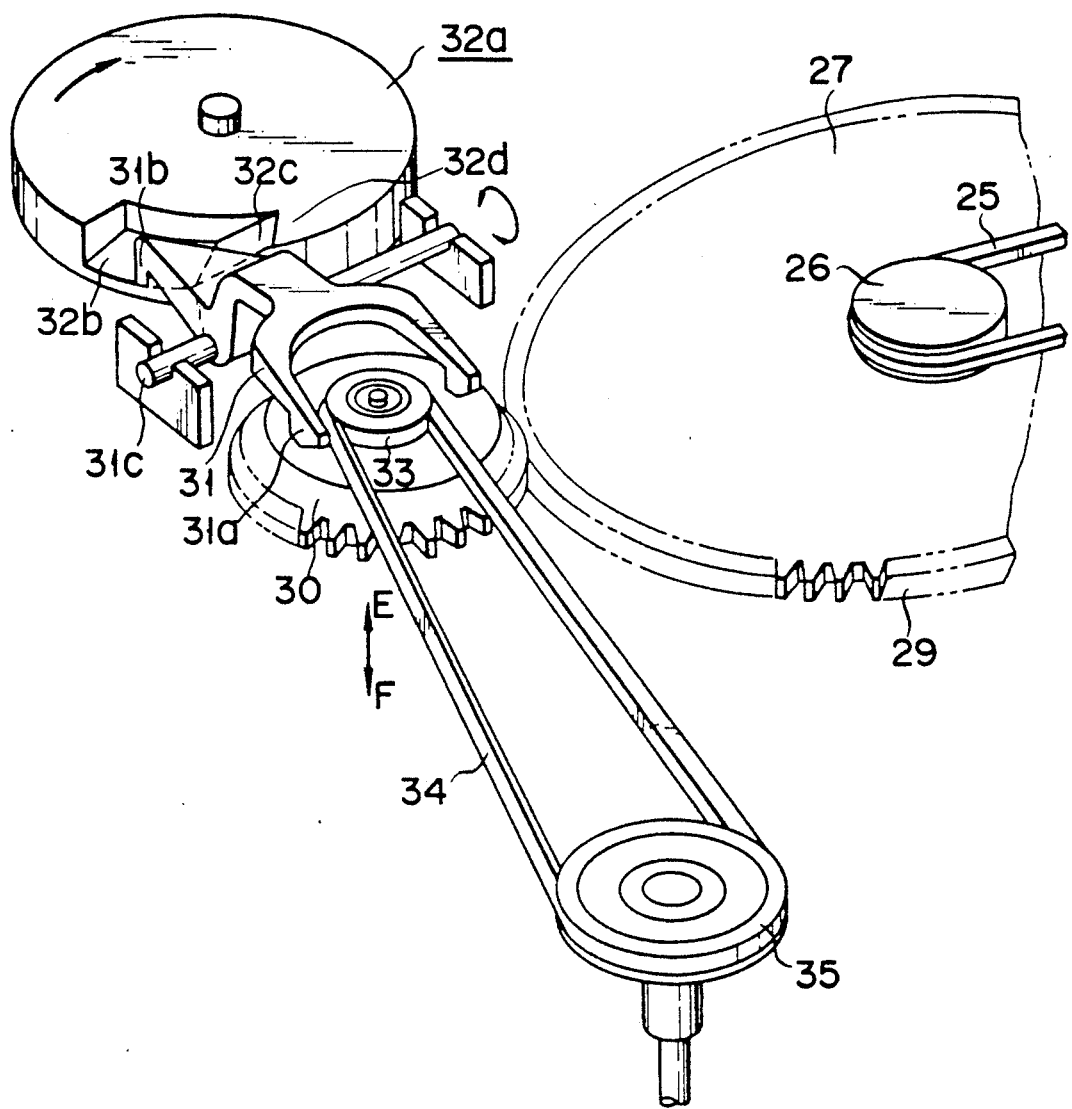
FIG. 3 is a perspective view of a switching mechanism.

As is shown in FIG. 3, driving gear 29 is fitted around the periphery of the rotating member of capstan motor 27. Vertically-movable gear 30 is arranged such that it faces driving gear 29. First end 31a of vertically-swingable switch lever 31 is in contact with the upper side of vertically-movable gear 30. Second end 31b of the switch lever 31 is engaged with one side of first mode-switching cam 32a, which is one of the axially-arranged mode-switching cams of the operation mode-switching mechanism.

First mode-switching cam 32a has step portion 32b which is in the form of a circular arc having predetermined size. Slanted portion 32c is formed in that end of step portion 32b which is located downstream with reference to the rotating direction of first mode-switching cam 32a. Slanted portion 32c is formed in such a manner that step portion 32b is smoothly connected to surface 32d of first mode-switching cam 32a.

With this construction, second end 31b of switch lever 31 engages with one of step portion 32b, slanted portion 32c and surface 32d of first mode-switching cam 32a in accordance with the rotation of this cam 32a. As a result of this engagement, first end 31a of switch lever 31 swings in the axial direction of vertically-movable gear 30, with rotatable shaft 31c as a center of swing.

As is shown in FIGS. 4A and 4B, vertically-movable gear 30 is coaxial with pulley 33, and this pulley 33 is coupled to main chassis 10 such that it is rotatable around shaft 33a. Vertically-movable gear 30 is located around pulley 33 and is urged toward pulley 33 in the axial direction of shaft 33a by spring 30a. The rotation of vertically-movable gear 30 is transmitted to pulley 33 through stop members 33b. That is, vertically-movable gear 30 and pulley 33 are rotatable in the same direction.

Driving belt 34 is wound around both pulley 33 and pulley 35. As is shown in FIG. 1C, pulley 35 is coaxial with worm 36 of front loading mechanism 13.

At the time of loading tape cassette C, second end 31b of switch lever 31 engages with step portion 32b, due to the rotation of first mode-switching cam 32a. Therefore, first end 31a of switch lever 31 is separated from vertically-movable gear 30. As a result, vertically-movable gear 30 is raised (in the direction E) by the urging force of spring 30a and brought into mesh with driving gear 29. Thus, the rotation of capstan motor 27 is transmitted to front driving mechanism 13 through vertically-movable gear 30, pulley 33, driving belt 34, pulley 35 and worm 36, whereby front driving mechanism 13 performs the loading of cassette holder 12.

When the loading of cassette C is completed, first mode-switching cam 32a is rotated, and second end 31b of switch lever 31 engages with surface 32d after sliding along slanted portion 32c. Therefore, first end 31a of switch lever 31 contacts vertically-movable gear 30 and pushes this gear downward. As a result, vertically-movable gear 30 is moved downward in the direction F in spite of the urging force of spring 30a. Thus, the rotation of pulley 33 is stopped, and the loading of cassette holder 12 is stopped, accordingly.

Loading motor 32 is designed to drive not only first mode-switching cam 32a mentioned above but also the other mode-switching cams.

As is shown in FIG. 1A, helical scan type cylinder 37 having magnetic heads (not shown) is rotatably coupled to main chassis 10 mentioned above. Around this cylinder 37, first and second guide holes 38a and 38b (which are parts of a tape-loading mechanism) are provided such that the two guide holes correspond in location to the tape inlet and outlet sides, respectively.

As is shown in FIG. 5A, first and second tape-pulling members 39a and 39b are fitted in first and second guide holes 38a and 38b, respectively, such that they are movable within the guide holes. Slanted post 40a substantially parallel to cylinder 37 and guide roller 41a substantially perpendicular to main chassis 10 are provided for first tape-pulling member 39a such that they are located side by side with reference to each other. Likewise, slanted post 40b substantially parallel to cylinder 37 and guide roller 41b substantially perpendicular to main chassis 10 are provided for second tape-pulling member 39b such that they are located side by side with reference to each other.

As is shown in FIG. 5B, the one-end portions of first and second links 41a and 42b are coupled to the ends of first and second tape-pulling members 39a and 39b, respectively. The other-end portions of first and second links 41a and 42b are supported by first and second driving gears 43a and 43b, respectively, which are in mesh with each other. Half-gear 44 is arranged coaxial with second driving gear 43b. Sectorial gear 45a formed at one end of driving lever 45 is in mesh with half-gear 44. An intermediate point of driving lever 45 is swingably supported by main chassis 10 by means of shaft 46. Pin 45b located at the other end of driving lever 45 engages with cam groove 32f formed in second mode-switching cam 32e, and this cam 32e is rotated within a predetermined angular range by loading motor 32. Therefore, driving lever 45 is driven by the movement of second mode-switching cam 32e, and transmits the driving force to first and second tape-pulling members 39a and 39b, through half-gear 44, first and second driving gears 43a and 43b, and first and second links 41a and 42b, thereby performing tape loading.

As is shown in FIG. 1A, pinch roller 47, which is part of the tape-driving mechanism, is arranged on main chassis 10 such that it is located in the neighborhood of capstan shaft 28 mentioned above. Pinch roller 47 is swingably supported by one end of pinch lever 48. Pinch lever 48 is swung in association with the above-mentioned mode-switching cams by a linking mechanism (not shown). As a result of the swing of pinch lever 48, pinch roller 47 supported at one end of lever 48 is pressed against capstan shaft 28, with tape T interposed.

Figure 6:
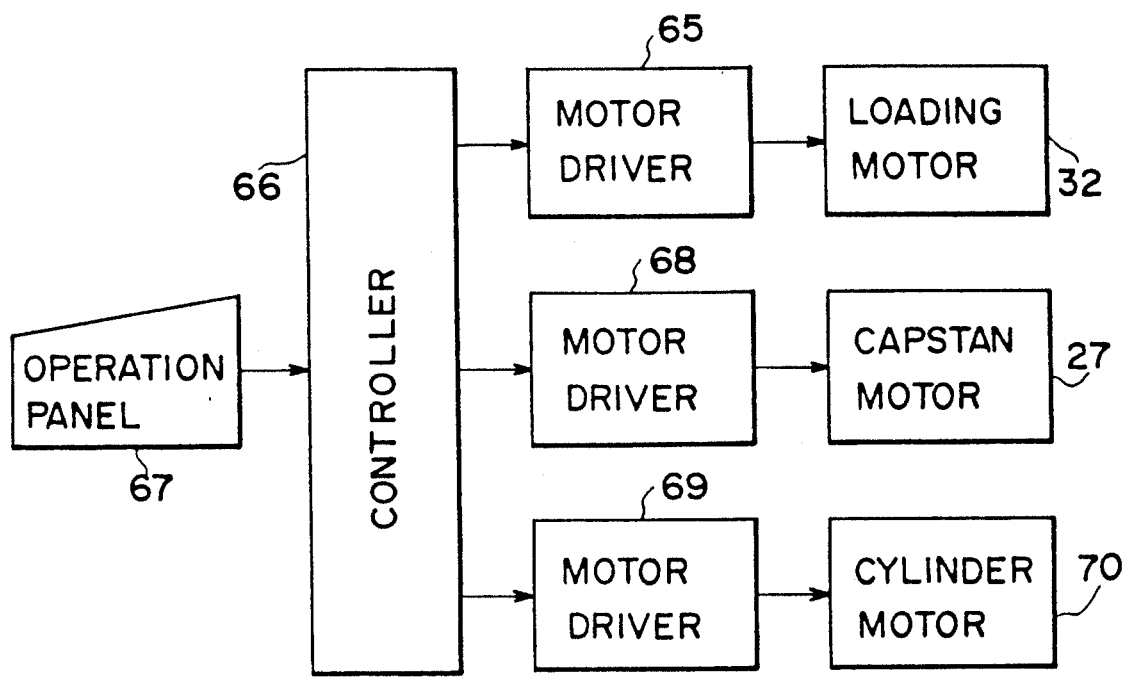
FIG. 6 is a block circuit diagram of the electric circuit of the VTR.

First and second mode-switching cams 32a and 32e mentioned above are coaxial with the other mode-switching cams (not shown). All these mode-switching cams are rotated within the same angular range by loading motor 32, and their angles of rotation are determined in accordance with the operation modes of the VTR. As is shown in FIG. 6, loading motor 32 is driven by motor driver 65 under the control of controller 66. In accordance with the user's operation of control panel 67, controller 66 determines an operation mode of the VTR. Controller 66 causes the mode-switching cams to be rotated by the angle corresponding to the determined operation mode. Further, controller 66 controls motor driver 68 in accordance with the determined operation mode, to thereby drive capstan motor 27. The torque of capstan motor 27 is selectively transmitted to capstan shaft 28, reel base 14 located on the tape supply side, reel base 15 located on the tape rewind side, etc. Still further, controller 66 controls motor driver 69 in accordance with the determined operation mode, to thereby drive cylinder motor 70 to rotate cylinder 37.

In the VTR having the above-mentioned construction, loading motor 32 is driven and first mode-switching cam 32a is rotated, in response to the insertion of tape cassette C into cassette holder 12. First mode-switching cam 32a actuates switch lever 31 in such a manner that vertically-movable gear 30 is brought into mesh with driving gear 29. After first mode-switching cam 32a is rotated by a first predetermined angle, loading motor 32 is stopped, with the mesh between vertically-movable gear 30 and driving gear 29 maintained. Simultaneous with this, capstan motor 27 is driven, and the driving force of this motor is transmitted to front loading mechanism 13 through driving gear 29, vertically-movable gear 30, pulley 33, driving belt 34, pulley 35, and worm 36, as mentioned above. Thus, tape cassette C is mounted on reel bases 14 and 15.

After the cassette loading is completed in the above manner, loading motor 32 is driven again, and first mode-switching cam 32a is rotated by a second predetermined angle. In accordance with this rotation, switch lever 31 is swung in the reverse direction E, causing vertically-movable gear 30 to separate from driving gear 29. Simultaneous with this, second mode-switching cam 32e coaxial with first mode-switching cam 32a is also rotated by the second predetermined angle, whereby first and second tape-pulling members 39a and 39b are driven to perform tape loading.

Thereafter, first and second mode-switching cams 32a and 32e, and other mode-switching cams (not shown) which are coaxial with first and second mode-switching cams 32a and 32e are rotated by the angle corresponding to a desirable operating mode. In accordance with this rotation of the cams, an operating mode-switching mechanism (not shown) is driven such that the tape-driving mechanism is selectively switched into one of the operating modes, such as the play mode, fast-forward mode, fast-rewind mode, etc.

As mentioned above, vertically-movable gear 30 is moved in the axial direction thereof, with reference to driving gear 29 driven by capstan motor 27, and the movement of gear 30 is controlled by switch lever 31 which is moved in association with the driving of first mode-switching cam 32a. In this manner, the driving force of driving gear 29 is selectively transmitted to front loading mechanism 13 through vertically-movable gear 30. Thus, the cassette-loading operation can be controlled with high accuracy by utilization of the driving force of capstan motor 27. Since the number of structural components of the VTR can be reduced while maintaining the highly-accurate operation of the front loading mechanism, the size and weight of the VTR can be reduced to the greatest degree.

The above embodiment was described, referring to the case where the present invention is applied to a VTR. However, the present invention is not limited to this. It can be applied to various types of magnetic recording/reproducing apparatuses as long as the apparatuses employ a front loading mechanism for loading a tape cassette. Needless to say, the advantages of the present invention remain substantially unchanged in such cases as well. In short, the present invention can be modified in various way without departing from the subject matter of the invention.

What is claimed is:

1. Apparatus for recording/reproducing data on a magnetic tape in a tape cassette comprising:
   a tape-driving mechanism for propelling the magnetic tape in a plurality of operating modes, the tape-driving mechanism including a capstan motor for driving a capstan located in a feed path of the magnetic tape;
   a first gear rotated in association with a rotation of the capstan motor;
   a second gear movable in an axial direction thereof and selectively engageable with the first gear;
   a cassette holder for receiving the tape cassette;
   a front loading mechanism for moving the cassette holder with the tape cassette and loading the tape cassette in the tape-driving mechanism;
   switching means for causing the second gear to separate from the first gear after the cassette is loaded, the switching means having a mode-switching cam which rotates after the tape is loaded, and a switch lever that pivots around a point thereon in response to the rotation of the mode-switching cam, for axially moving the second gear, the mode-switching cam including:
   a flat surface portion;
   a step portion parallel to the flat surface portion and having a top surface that is lower than the flat surface portion; and
   a slanted portion formed in an end of the step portion and connecting the top surface of the step portion to the flat surface portion; and
   the switch lever including:
   a first end raised above the second gear before the mode-switching cam rotates;
   a second end in contact with the step portion before the mode-switching cam rotates, and which contacts the step portion, slanted portion and flat surface portion, respectively, after the mode-switching cam begins rotating; and
   a shaft, located between the first end and the second end, for pivoting the switch lever thereon so that the first end moves downward and imparts a force on the second gear when the second end contacts the flat surface portion.

2. The apparatus according to claim 1, wherein the first end of said switch lever moves the second gear in a direction away from the first gear when the second end of the switch lever engages with the step portion.

3. The apparatus according to claim 1, wherein the front loading mechanism includes:

a pulley arranged coaxially with the second gear, the pulley rotating with the second gear;

a driving belt wound around the pulley; and a cassette holder-moving mechanism, driven by the driving belt, for moving the cassette holder.

4. The apparatus according to claim 3, wherein said switching means includes rotation-controlling means for controlling the rotation of the pulley by moving the second gear in the axial direction thereof.

* * * * *